(12) United States Patent
Freudenberger (10) Patent No.: US 10,178,267 B2
(45) Date of Patent: Jan. 8, 2019

(54) HYBRID VECTOR/BITMAP PRINTED WARPED SECURITY FEATURE

(71) Applicant: Entrust Datacard Corporation, Shakope, MN (US)

(72) Inventor: Marco Freudenberger, Reinheim (DE)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 95 days.

(21) Appl. No.: 15/358,722

(22) Filed: Nov. 22, 2016

(65) Prior Publication Data

US 2017/0144470 A1    May 25, 2017

(30) Foreign Application Priority Data

Nov. 23, 2015    (DE) .................. 10 2015 120 241

(51) Int. Cl.
*H04N 1/32* (2006.01)
*G06K 15/02* (2006.01)
(Continued)

(52) U.S. Cl.
CPC .......... *H04N 1/32219* (2013.01); *B41M 3/14* (2013.01); *B42D 25/23* (2014.10); *B42D 25/24* (2014.10); *B42D 25/30* (2014.10); *B42D 25/41* (2014.10); *B42D 25/435* (2014.10); *G06K 15/021* (2013.01); *G06K 15/128* (2013.01);
(Continued)

(58) Field of Classification Search
CPC ........ B42D 25/20; B42D 25/23; B42D 25/24; B42D 25/30; B42D 25/305; B42D 25/318; B42D 25/333; B42D 25/40; B42D 25/405; B42D 25/41; B42D 25/425; B42D 25/435; H04N 1/32144; H04N 1/32149; H04N 1/32219; H04N 1/32261; G06K 15/021; G06K 15/12; G06K 15/1209; G06K 15/128; B41M 3/14; G06T 3/0093

See application file for complete search history.

(56) References Cited

U.S. PATENT DOCUMENTS 6,164,701 A    12/2000 Murl
7,385,612 B1 *    6/2008 Peterson ............... G06T 3/0093
345/581

(Continued)

FOREIGN PATENT DOCUMENTS

| EP | 2035236 | 5/2011 |
|---|---|---|
| WO | 03057503 | 7/2003 |
| WO | 2008000728 | 1/2008 |

OTHER PUBLICATIONS

International Search Report and Written Opinion of International Application No. PCT/US2016/063302, dated Mar. 13, 2017, 16 pages.

*Primary Examiner* — Scott A Rogers
(74) *Attorney, Agent, or Firm* — Hamre, Schumann, Mueller & Larson, P.C.

(57) ABSTRACT

A technique is described by which a warped security feature is created on a substrate using a hybrid vector/bitmap process. The print element follows a series of curved vector lines during printing to form the security feature, instead of the straight line-by-line process used with a bitmap image. The method of producing the warped security feature, the warped security feature, and the substrate containing the warped security feature are considered to be unique and inventive.

10 Claims, 6 Drawing Sheets

(51) Int. Cl.
- *G06K 15/12* (2006.01)
- *G06T 3/00* (2006.01)
- *B42D 25/23* (2014.01)
- *B42D 25/24* (2014.01)
- *B42D 25/30* (2014.01)
- *B42D 25/41* (2014.01)
- *B42D 25/435* (2014.01)
- *B41M 3/14* (2006.01)

(52) U.S. Cl.
CPC ........ *G06K 15/1209* (2013.01); *G06T 3/0093* (2013.01); *H04N 1/32261* (2013.01)

(56) References Cited

U.S. PATENT DOCUMENTS

| | | | | |
|---|---|---|---|---|
| 7,412,360 | B2 * | 8/2008 | Surazhsky | G06T 3/0093 345/441 |
| 8,783,580 | B2 * | 7/2014 | Lesur | B42D 25/405 235/494 |
| 10,076,923 | B2 * | 9/2018 | Arsenault | B42D 25/378 |
| 2004/0076310 | A1 * | 4/2004 | Hersch | B42D 25/342 382/100 |
| 2006/0003295 | A1 * | 1/2006 | Hersch | B42D 25/342 434/110 |
| 2006/0075241 | A1 * | 4/2006 | Deguillaume | G06F 21/10 713/176 |
| 2007/0246930 | A1 | 10/2007 | Wicker | |
| 2009/0284802 | A1 | 11/2009 | Yeap et al. | |
| 2010/0290663 | A1 | 11/2010 | Trassl et al. | |
| 2012/0018992 | A1 | 1/2012 | Nugent et al. | |
| 2015/0146297 | A1 * | 5/2015 | Commander | B42D 25/30 359/627 |
| 2017/0217243 | A1 * | 8/2017 | Thurailingam | B42D 25/41 |

\* cited by examiner

HYBRID VECTOR/BITMAP PRINTED WARPED SECURITY FEATURE

FIELD

This technical disclosure relates to a security feature on a substrate to deter counterfeiting of the substrate. The security feature is created using a hybrid vector/bitmap process which causes the laser or other capable printing device to follow curved printing lines during printing to create a warped security feature such as wavy line text, curved text, curved images, and the like.

BACKGROUND

The use of security features that are printed in a wavy pattern or wave shape on a security document are known from EP 2 035 236 B1 and U.S. Pat. No. 6,164,701. These security features generally comprise a string of alphanumeric characters derived from personal data, for example the date of birth and/or the name, of the intended holder of the security document.

Figure 1:
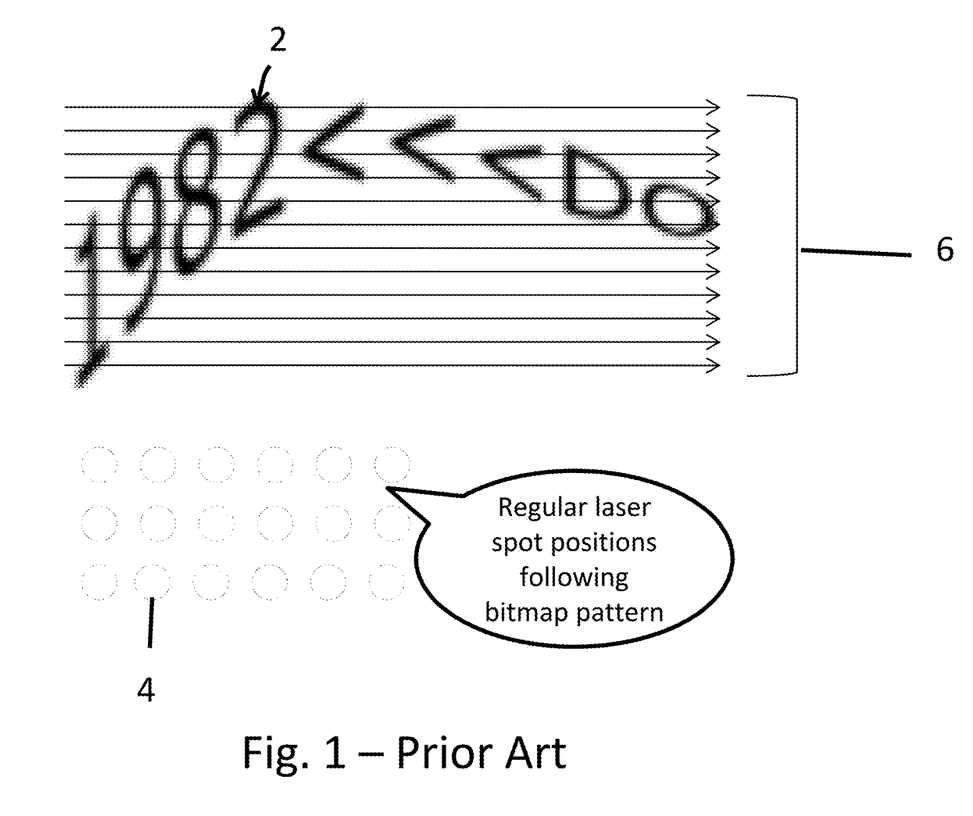
FIG. 1 illustrates a warped security feature produced using a prior art bitmap process.

An example of a warped security feature 2 is illustrated in FIG. 1. To produce the security feature 2 on the security document, the characters that are intended to form the security feature 2 are entered and processed to produce a bitmap image. The characters are transformed along a given arc, curve or warped into a hull which generally involves warping a "straight" object such as the characters by a given mathematical transformation. The bitmap image is then sent to a laser processing mechanism or inkjet printer to print the security feature 2 like any conventional text or image bitmap image. The security feature 2 is formed by a series of small spots 4 on the security document based on the bitmap image. The security feature 2 is printed line-by-line 6 in a vertical direction, with the spots 4 that form the characters of the security feature being generally evenly spaced according to the generated bitmap pattern.

However, any counterfeiter that is capable of preparing an image containing an image or text warped to a given curve can take any regular laser processing equipment or printing equipment and fake the security feature 2. Therefore, since the output of the conventional warped security feature is a bitmap image which can be printed using conventional printing technology, the security afforded by the security feature 2 resides primarily in the data generation process.

Pure vector mode is available on some laser processing devices. Vector mode is typically used as a fast way to laser mark text or simple logos. Most laser processing devices use a mirror system to deflect the laser light to the final position. In vector mode, those mirrors are programmed (controlled) to follow a vectorial description of a text or image to be produced, most often defined by a series of short straight lines, sometimes arches, Beziér splines or a series of single finite positions.

In pure bitmap mode or image mode, the laser light scans the target area in straight lines (typically horizontal or vertical) and while the area is scanned, producing laser pulses. The result is a rectangular matrix in which single dots are either "set" (laser fired) or "not set" (laser not fired). On grayscaling laser processing devices, the power of single laser dots might differ to produce darker or lighter dots.

As this technique is very similar to what laser printer equipment or inkjet printers do when it comes to creating (rasterizing) images, except for the fact that laser processing is based on a reaction in the target material rather than to applying ink or toner to an object, the results look very similar.

Improvements to the production of warped security features are needed to prevent fraud using widely available home/office accessible reproduction devices.

SUMMARY

A technique is described by which a warped security feature is created on a substrate using a hybrid vector/bitmap process. The hybrid vector/bitmap process uses a hybrid vector/bitmap data stream that causes the print element to follow a series of curved vector lines during printing to form the security feature, instead of the straight line-by-line process used with a bitmap image. The normally straight lines of a bitmap (or of the bitmap representation of the text) itself will become curved vector lines so that the lines of the "warped" bitmap or text follow the warped form. The method of producing the warped security feature, the warped security feature, and the substrate containing the warped security feature are considered to be unique and inventive.

As used herein, the term "warped" refers to text or images that are produced in a wavy pattern or line, follow a curved path, appear as a ball-like figure, or otherwise appear curved or deformed in some manner. Many different variations of warped security features are possible. For example, the text and/or image could vary in height along some or the entire security feature or be constant in height. In another example, one edge of the security feature could be linear, while an opposite edge could follow a curved path. Other curved shapes are possible and contemplated herein. Examples of text or images that are warped are disclosed in EP 2 035 236 B1 and U.S. Pat. No. 6,164,701, as well as the PersoCurve™ implementation by Entrust Datacard Corporation of Shakopee, Minn., USA. The entire text or image could be warped, or only a portion could be warped.

Creating or forming the security feature on the substrate includes forming a part of the security feature or the entirety of the security feature.

The technique described herein controls the print element (such as a laser beam during a laser processing operation) in a hybrid image and vector mode to produce the warped security feature so that the resulting security feature can be optically, visibly distinguished from conventionally printed warped security features. Depending on parameters of the application (such as resolution, spot distance, laser power, etc.), the differences might be visible to the naked eye, or visible only by using a magnification device such as a loupe, microscope, or other magnification device.

In one embodiment, the warped security feature is created by laser marking with a laser marking device which is used to create a mark on a substrate, such as on a laser receptive layer or any other layer or portion of the substrate, using a laser beam. As used herein, laser processing, laser processing equipment, laser printing and the like refer to the creation of markings on a material using a laser beam. One example of laser processing is laser marking using a laser marking device where a laser creates a mark in or on a laser receptive layer or other substrate by discoloring the surface of or other portion of the laser receptive layer or other substrate without cutting into the surface or marking the laser receptive layer or substrate by cutting into the surface. In one embodiment, laser marking can include the creation of a mark by engraving or cutting into the surface of the substrate using the laser which in some embodiments can occur together with discoloration of the surface. Data produced by laser marking may also be referred to as printing or personalization. However, any printing device that is capable of creating similar looking results could be used.

With the technique described herein, documents are made secure during the personalization process by printing variable data (such as card holder information or anything else) in a way that is both easy to verify at borders or other access control locations and which cannot be recreated on standard printing devices like high-resolution laser printers, inkjet printers or even some laser processing equipment.

The substrates can be any substrates that one may wish to protect using a security feature. Examples of substrates include, but are not limited to, personalized security documents such as plastic cards including but not limited to financial (e.g. credit and debit) cards, drivers' licenses, national identification cards, and other plastic cards which bear personalized data unique to the card holder and/or which bear other card or document information, as well as to passport pages that are used in passports. A substrate also includes an individual layer or layers within or intended to form part of such specific documents, cards or pages.

So the term "substrate" as used herein is intended to include the entirety of an identification document or other document containing at least one of the security features described herein, or to one or more layers within or that form or will form part of the document and where at least one of the security features described herein is formed in the layer.

The print element is preferably a laser of a laser processing mechanism. The beam path of the laser can be readily controlled to enable it to follow the curved vector lines. However, other print elements could be used as long as the print elements can follow the curved vector lines. In one embodiment, the substrate remains stationary while the laser beam or other print element moves along the curved vector lines relative to the substrate. In another embodiment, the substrate is moved along the curved vector lines while the laser beam or other print element remains stationary. It would also be possible to move both the substrate and the print element along the curved vector lines.

The warped security feature can be formed from alphanumeric text or characters, an image, or combinations thereof. In the case of security documents, the text or image can be variable (i.e. variable from one security document to the next), and personal to the intended holder of the security document. Examples of variable text include, but are not limited to, a person's name, date of birth, an account number assigned to the person, some or all of an address, or other data personal to the intended holder of the security document. The variable image could be a portrait image of the intended holder of the security document. The text or image can also be fixed (i.e. not variable so that the same text and/or image is used on multiple documents) and not personal to the intended holder of the security document and used on multiple documents, such as a government entity name, name of the document issuer, a company logo, a general security logo, or the like.

In one embodiment, a method of producing a warped security feature on a plastic card or a passport page (or other substrate) includes creating a hybrid vector/bitmap data stream that is used to form the warped security feature, where the hybrid vector/bitmap data stream includes vector position information and intensity value information. The hybrid vector/bitmap data stream is then used to control a print mechanism to create spaced spots on the plastic card or a passport page (or other substrate) to form the warped security feature. The print mechanism follows curved vector lines dictated by the vector position information and the intensity value information is used to create the spots that form the warped security feature.

In another embodiment, the spots are dots or lines or any other shape, which can be created by a suitable print mechanism, such as a laser, which results in formation of the security feature.

In another embodiment, when the print mechanism is a laser, the power of the laser is adjusted based on the intensity value information in the hybrid vector/bitmap data stream to create at least some of the spots using different laser powers.

In another embodiment, when the print mechanism is a laser, the laser is controlled to create at least some of the spots with irregular spacing between the spots.

In another embodiment, the warped security feature comprises alphanumeric characters or an image.

In another embodiment, the substrate comprises a paper substrate and the print mechanism comprises a general purpose printer.

In yet another embodiment, a plastic card or a passport that includes a passport page (or another substrate) contains the warped security feature produced by the method described herein. The spacing between at least some of the spots forming the warped security feature is irregular, and the spots are arranged into a pattern so that some or all of the warped security features follows a curved path.

In another embodiment, a warped security feature on a plastic card or on a passport page (or on another substrate) is produced by the method described herein.

DETAILED DESCRIPTION

Improved documents (for example, identification documents, passports, and the like) can include a warped or curved security feature formed by printing or lasing a plastic card substrate or passport page substrate in a hybrid vector/bitmap data stream so that the dots or spots that make up the security feature follow the curve or wave function associated with the data stream. Forming the security feature by printing or lasing using a hybrid vector/bitmap data stream facilitates production of security features that are visually (for example with or without magnification) distinguishable from similar security features produced by bitmap methods or by vector printing methods. For example, the distance between spots or dots can vary when the security feature is produced by printing or lasing using the hybrid vector/bitmap data stream. In contrast, bitmap methods produce security features with regular spot positions. The incorporation of security features produced using the methods of the present disclosure can make it difficult, if not impossible, to manufacture authentic looking (i.e. to the naked eye or with magnification) counterfeit documents using the pixel matrix oriented equipment typically employed by counterfeiters, thus adding additional security and protection to the documents. In some embodiments, the security feature can be formed into a surface of a laser reactive layer or material. The security feature can be formed in any appropriate or desired shape or size.

In addition, the security feature can be formed multi-tone with multiple different colors. For example, the security feature could transition from a generally black color to a generally grey color along one or multiple directions of the security feature.

In some embodiments, the security feature can be completely or partially tactile on the resulting document.

The following describes a method of producing a warped security feature on a substrate using a hybrid vector/bitmap data stream. The substrates can be any substrates that one may wish to protect using a security feature. Examples of substrates include, but are not limited to, personalized security documents such as plastic cards including but not limited to financial (e.g. credit and debit) cards, drivers' licenses, national identification cards, and other plastic cards which bear personalized data unique to the card holder and/or which bear other card or document information, as well as to pages of passports.

To facilitate the explanation provided herein, the warped security feature will be described as being produced using a laser in a laser processing mechanism. However, other print elements/mechanisms could be used as long as the print elements can follow the curved vector lines without rasterizing the print data to a bitmap.

As indicated above and described in more detail below, the technique described herein employs a hybrid approach of vector and bitmap mode to produced warped images like text (wavy line text, deformed text, etc.) or images (images warped or curved to a target area, for example a rectangular image into a ball-like figure).

In a known PersoCurve implementation by Entrust Datacard Corporation discussed further below, a warping function is implemented by applying mathematical functions to a rectangular text source area based on a curve and hull around the curve to transform the text. This happens through a series of mathematical transformations from original coordinates to target coordinates. The results are then rendered into a rectangular bitmap image for subsequent application using the laser processing mechanism.

However, unlike the known PersoCurve implementation by Entrust Datacard Corporation, instead of rendering the results into a rectangular bitmap image, in the technique described herein, the warping function itself is used to control the laser during the laser process, by using the transformation function for each position (pixel) of the output image. So the laser scans not straight lines, but lines that follow the design of the transformation. As a result, the laser processing on the target area does not look like a rectangular matrix of dots (pixels), but the dots (pixels) of the image follow the original mathematical description of the transformation.

Figure 2A:
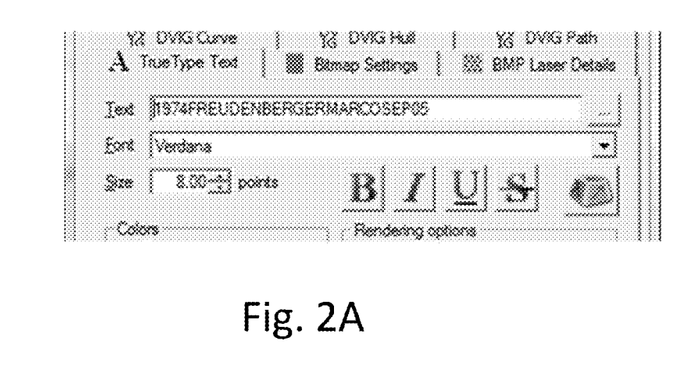
FIGS. 2A, 2B, 2C and 2D illustrate an example general process of creating a warped security feature.
Figure 2B:
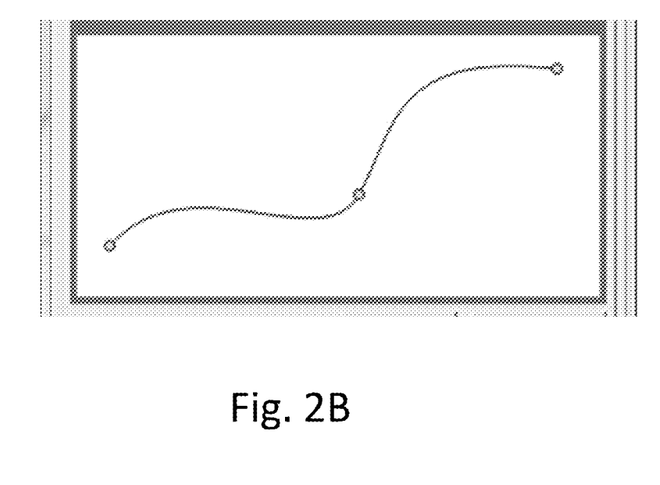
Figure 2C:
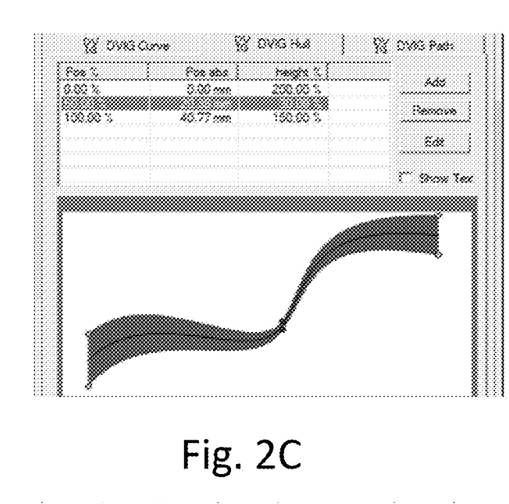
Figure 2D:
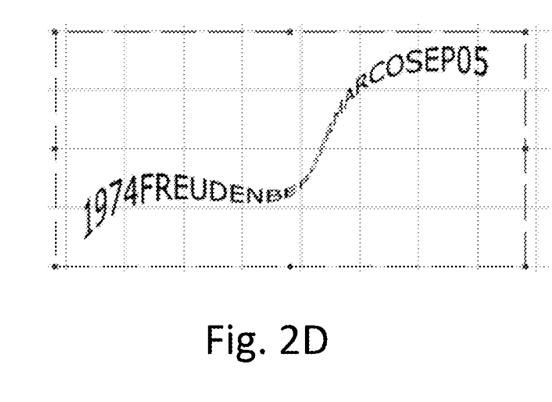

The general technique of creating a warped security feature using bitmap printing is known in the art. In one example illustrated in FIGS. 2A-D, the text or other data that is to form the security feature is entered by the user (FIG. 2A). A Bezier curve is then generated (FIG. 2B) which reflects the general centerline of the curved shape of the intended security feature. The relative heights of the text elements along the curve are then chosen, and based on the relative heights, a hull is then generated (FIG. 2C) that reflects the general outline of the security feature. The text elements are then fit into the hull (FIG. 2D). The warped security feature is then printed on a straight line-by-line basis as shown in FIG. 1. This technique is known in the art and is implemented in the PersoCurve implementation used in the laser processing mechanism employed in the PB6500 Passport Issuance System available from Entrust Datacard Corporation of Shakopee, Minn.

Creating a warped security feature on a substrate using a hybrid vector/bitmap process can follow a generally similar process, except that instead of printing on a straight line-by-line basis, the print element follows curved printing lines.

In a first example approach, a first rendering process is performed on the text or image that is to form the warped security feature by taking a vectorial description of the text and/or image and warping it to a target. This first rendering process is similar to the existing PersoCurve implementation discussed above and illustrated in FIGS. 2A-D. A vectorial description (for example outline, fill state) of the text and/or image (for example a photograph, logo or other image) is warped by a transformation function by warping all positions such as line edges, control points, line intersections, etc. In case of the known PersoCurve implementation, this warped vectorial description would be rendered into a bitmap.

Instead of doing rendering into a bitmap, in the hybrid vector/bitmap process described herein, the image will be rendered through a software process that "scans" the vectorial description on virtual pixel positions based on the description of the transformation. For each pixel to be lased, this results in a position and a gray level. The position and the gray level are transferred to the laser system and the laser moves from position to position marking a pixel where required.

This first example approach is very adaptable since across the printed image different pixel area sizes can be created to result in different output dots per inch (DPI) in areas where scan lines would be closer together.

In a second example approach, rectangular input bitmaps are warped. In this approach, the input is a rectangular input image (i.e. a bitmap containing either rendered straight text or any image). The transformation function is then applied to each pixel. As a result, original, rectangularly aligned pixel positions of an image get transferred into target positions. The pixel values (grey levels) do not change, unless they are scaled in areas where the distance of a target dot to its neighbor(s) is extremely close to avoid burning the material.

Figure 3:
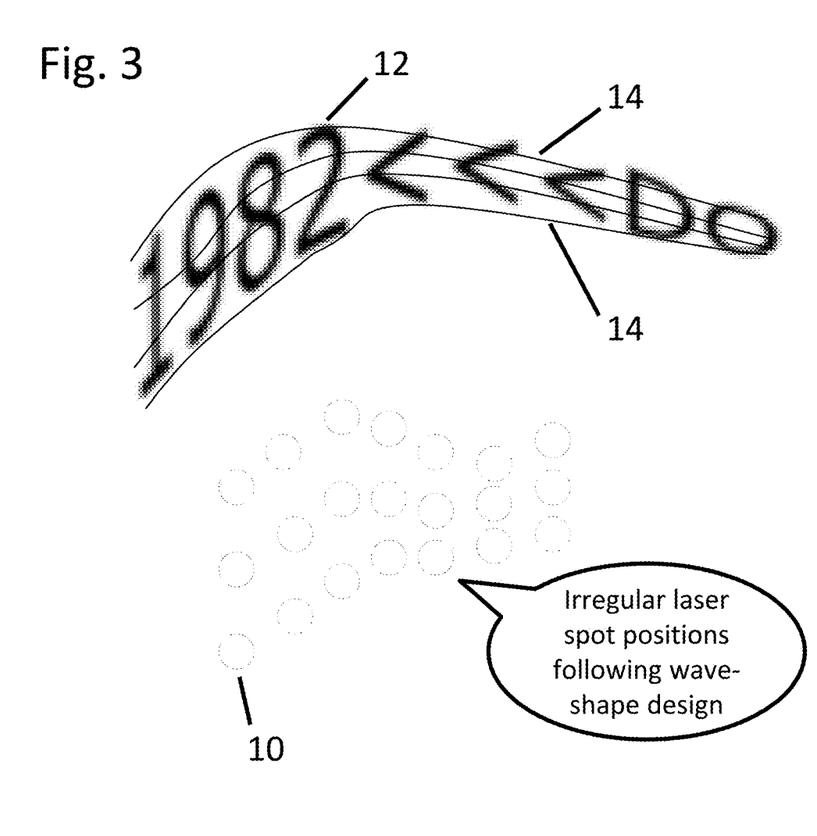
FIG. 3 illustrates a warped security feature produced using a hybrid process described herein.

With reference to FIG. 3, the vector file or vectorial description is then used to control the laser of the laser processing mechanism to create spaced spots 10 in the substrate to form the warped security feature 12. The security feature 12 may also be described as being wave-shaped. The laser of the laser processing mechanism follows curved vector lines 14 dictated by the hybrid vector/bitmap data stream to create the spots 10 that form the warped security feature 12. For example, the lines 14 can follow the Bezier curve/hull that is generated based on the entered data and desired shape of the security feature as illustrated in FIGS. 2A-D. As illustrated in FIG. 3, the spots 10 also follow the curved shape.

Example of Hybrid Vector/Bitmap Processing

As described above, the print element, such as a laser, can be controlled using a hybrid of bitmap and vector mode. To aid in explaining this hybrid mode, standard bitmap and vector modes will be explained with respect to a laser.

However, the techniques described herein are not limited to using a laser as the print element.

Bitmap Mode

In a standard implementation of a bitmap mode, amongst other information, the position of the bitmap (for example, but not limited to, top left corner of the image/bitmap on the card, substrate or other workpiece), a size (number of pixels per line and number of lines) and the resolution of the image is transferred to the laser control system followed by the actual raw image data stream (pixel information). Depending on the exact type of laser control system, the pixel information typically consists either:

- of 0's and 1's (pixel off, pixel on) for laser systems not capable of grayscaling; or
- of values (either brightness or laser power) which define how dark the pixel shall be lased (exact implementation depends on the laser system; for example, in the Entrust Datacard MX series laser systems, the values per pixel are between 0 (white) and 255 (dark); other value ranges are possible depending on the exact implementation).

The laser system then scans the area of the image (defined by the size and resolution) line-by-line or row-by-row and creates spots, depending on the pixel information, on the substrate. The position of each pixel is determined by the size and resolution data; the darkness/intensity/gray level of each pixel is determined by the position of each pixel in the corresponding raw image data stream.

Example data stream (simplified) for producing the letter "A":

Bitmap position x=1.0 inch; y=0.5 inch; Bitmap resolution=100 dpi; bitmap size x=5 pixels; bitmap size y=6 pixels; lasing direction=horizontal; bitmap datastream: 0 0 0 255 0 0 0 0 0 255 0 255 0 0 0 255 0 0 0 255 0 0 255 255 255 255 0 0 255 0 0 0 255 0 0 255 0 0 0 255 0

The laser control would calculate the distance of the pixels (given by DPI) and move the mirrors along straight lines when the laser is pulsed to create a matrix-like dot result.

Figure 6:
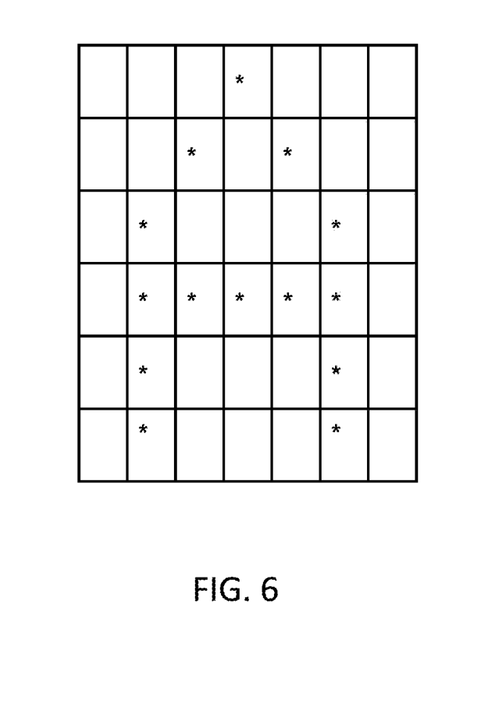
FIG. 6 is an example of a letter A produced using a bitmap mode.

The result would be an image like the image in FIG. 6 where the star (*) represents a dark laser dot.

Vector Mode

In a standard implementations of a vector mode, suitable commands with a definition of a shape to follow with the mirrors of a laser scanhead (or a definition of how to move the substrate relative to the laser source) are sent to the laser together with control parameters to turn on and off the laser source. As a result, an inscription should be visible in the laser receptive layer along the path defined by the shape sent as vector.

Vector mode can be thought of like drawing or writing on a piece of paper with a pen. The pen either touches the paper (equivalent to "laser on") or is lifted away from the paper (equivalent to "laser off"). Then the hand of the writer moves around on the paper leaving marks, for example by following three lines when the pen is down on the paper when writing the capital letter A as a block letter. In actual implementations, laser processing equipment can be either turned on "permanently" (continuous wave mode) when the laser is turned on, leaving an impression of a continuous line, or "pulsed" (single laser pulses shot while laser is turned on) which, depending on the speed of the vector to follow, also looks like a continuous line (for example, the laser spots are very close to each other or are overlapping) or like single dots (laser spots visible).

The exact data format differs from laser processor to laser processor. For example, in the Entrust Datacard MX series laser, cubic Bezier splines or a series of positions (waypoints) to define the path of the laser beam in pure vector mode are sent. Other manufactures send lines, arcs, a series of single positions to move between, relative speed change commands or combinations thereof.

Figure 7:
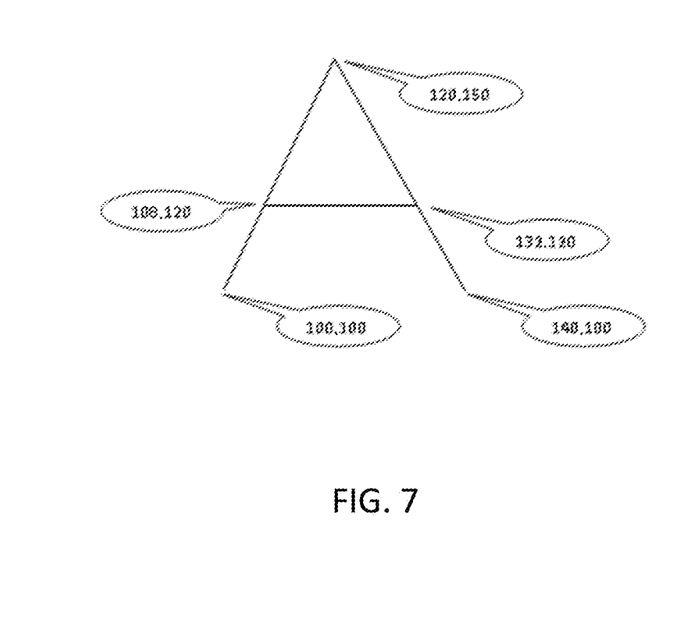
FIG. 7 is an example of a letter A produced using a vector mode.

Example data stream (simplified, values in brackets are x and y coordinates) for producing the letter "A" illustrated in FIG. 7:

MOVE TO (100, 100), LASER ON, MOVE TO (120, 150); MOVE TO (140, 100), LASER OFF, MOVE TO (132, 120), LASER ON, MOVE TO (108, 120), LASER OFF

This example is extremely simplified and represents one of many similar ways how vector laser marking is implemented by different manufacturers.

Hybrid Vector/Bitmap Mode

The hybrid vector/bitmap mode described herein is a combination of vector and bitmap modes where both positions and intensity values for the laser spots are sent in the data stream. The image to be created on the substrate is defined by a vector to follow for each line of the image (which is defined by/calculated from the warping function of the security feature), while the intensity value for each pixel (spot or pulse, see pulsed mode above) that is shot along the movement of the mirror of the laser scanhead or movement of the substrate below the light source is transferred as a data stream like in bitmap mode.

In one embodiment, a vectorial description of each line of the warped output image is sent, by sending a set of coordinates together with a value that defines the darkness or intensity of the spot on this position. The value could either be a stream that modulates the laser while moving along the vectorial description, or single spot positions for each spot together with the value of darkness at each spot position.

An example simplified data stream with single spot positions for each spot together with a darkness value for each spot is as follows:

Dot(x=100,y=100,value=0), Dot(x=102,y=100, value=10); Dot(x=104,y=101,value=200); Dot(x=105,y=102, value=255), Dot(x=106,y=, x=103; value=200), . . .

The meaning of x and y in this example is simplified as well. x, y might be a digital position representation as in this example or a dimensional position for example in millimeters or inches. x, y might not even be an actual position, but could instead be a definition of power or acceleration used to move a mirror of the laser scanhead in either direction or to move the substrate below the laser source.

When position data is transferred, the laser spot might not fully reach the given target position due to lag resulting from the inertia of the mirror(s) in the laser scanhead or the inertia of the substrate which is moved along below the laser source. This can be problematic given the very short time between laser pulses of a typical laser (for example, 10 µs at 100 KHz). So in one embodiment, instead of actual positions, the positional values transferred might be acceleration or power values or similar.

So the laser control system makes the mirror positions follow the set of dot positions, firing the laser with the value assigned to each dot.

Example of Data Processing of Security Feature

In one example, a data stream as described in the hybrid vector/bitmap mode above would be generated. The data stream can include, or consist of, dot positions (x and y, in millimeters on the target substrate relative to a lower-left corner of the substrate target area) and an intensity value for each dot (any value from 0 to 255; 0 meaning white; 255 meaning black; value in between 0 and 255 representing shades between white and black). In an embodiment, a bitstream mode to perform black-and-white processing can be used instead of grey-scaling. In bitstream mode (a feature to control the power of the laser faster that works like a non-grayscaling laser) only 0's and 1's (for example, laser off, laser on) would be sent.

Steps of data processing can include the following:
1. A raster image representation of the security feature (text and/or photo) is created containing gray values for each pixel.
2. A warping function of some kind is created that is a 2D warp transformation from the original raster image representation to a warped representation. In one embodiment, this can be done similarly to the current PersoCurve™ implementation of Entrust Datacard by defining a line to follow and a hull around that line. See FIGS. 2B and 2C discussed above.
3. The security feature image is then fit into the area that is the pre-image of the warping function in step 2 by means of scaling and/or centering the image into the area. The size of the source image is not necessarily the same as the size of the pre-image of the warping function. How the source image is fit into the pre-image of the warping function can be accomplished in any suitable manner. For example, for the x-direction, parameters such as left-align, right-align, center-align, increase/decrease size to fit (stretch), crop, etc. can be used. The same for the y-direction. A similar fit technique is used for text in the Entrust Datacard PersoCurve™ implementations). As a result, each of the pixels gets an absolute (source) position.
4. The source position of each of the rectangular source image's raster points (pixels) in the domain as produced in step 3 is projected into its position in the co-domain as defined at http://en.wikipedia.org/wiki/Co-domain using the warp function obtained from step 2. The result is a (mathematical) function in the codomain that is the set of all coordinates of the original pixels transformed by the warp function. In other words, each pixel's position is transformed to a new position depending on the warp function. The result is an individual position for each dot that is not within any matrix as a raster graphics would be (see FIG. 3). In other words, the source image is a representation of pixels in a fixed matrix. In the resulting image, each pixel has a finite position that is not a fixed position defined by a matrix (i.e. not organized in rows and columns like the matrix, but having "free floating" positions).
5. If necessary and if implemented, the darkness of each pixel could be scaled depending on the distance to its neighbors (horizontal and vertical) which darkness is reduced or increased depending on the warping function and the pixel position to alter the visual impression of the security feature. Pixels that are closer to its neighbors could be lightened and pixels that are further away from its neighbor could be darkened. Due to the nature of the warping function created in step 2, the distance to neighbor pixels can easily be calculated by calculating the width and/or height of a warped square with side length (1/(preimage resolution)) around the center of the original pixel position (or the position in the domain), or by actually calculating the distances to the new position after transformation (in the codomain) of its original left, right, bottom, and top neighbor pixels in the original matrix defined in step 1. Increased/decreased relative average distance among pixels can then be used to scale the darkness of each pixel accordingly. In other words, if pixels in the codomain are closer together (a pixel is closer to its neighbors) due to the transformation, the overall appearance is that this spot is darker, due to the reduced distance. To compensate for that, the spot can be made lighter. In general, a pixel can be considered to typically have four neighbors (left, right, bottom, top). However, the average distance in the source image is always the same (average pixel distance=pixel distance=1/dpi). The average distance to its neighbors in the transformed image is determined by: (distance to neighbor 1+distance to neighbor 2+distance to neighbor 3+distance to neighbor 4) divided by 4. The "relative average distance" is the average distance in the transformed image divided by the average distance in the source image. When the relative average distance >1.0, the pixel is made darker; when the relative average distance <1.0, the pixel is made lighter.
6. The resulting position for each pixel, together with its gray value is then sent, line by line, starting at the top-left corner of the raster image, to the laser control system in a data stream as represented by the hybrid example in the example discussed above (i.e. a series of "dots" describing each resulting laser spot with individual positions and gray values).

As a result, for each security feature to be printed (warped image, text field), a hybrid vector/bitmap data stream is created containing vector position information for each pixel and the intensity value information for each pixel (along with header and other control data, for example laser repetition rate, acceleration ramps for the mirrors in the laser scanhead of the Entrust Datacard MX series laser).

The laser would move from each spot position to the next spot position, firing a laser pulse at each position with the power defined by the gray value assigned to the respective spot. The spots on the substrate thus would follow lines that follow the original warping function defined in step 2 for each of the lines of the security feature (text and/or photo).

The laser processing mechanism that is used can be any laser processing mechanism where the laser beam can be controlled to follow the curved vector lines 14. An example of a suitable laser processing mechanism is the laser processing mechanism used in the PB6500 Passport Issuance System or used in the MX-line of Card Issuance Systems available from Entrust Datacard Corporation of Shakopee, Minn. However, the process is not limited to using a laser processing mechanism. Any printer where the print head can follow the curved vector lines 14, or where the substrate can be moved along the curved vector lines relative to the laser beam or print head, can be used.

As shown in FIG. 3, at least a portion of the security feature 12 is created with variable spot density so that at least some of the spots 10 have irregular spacing between the spots. For example, a higher spot density can be used in small areas to create microprinting. This difference in spot density can be visible with the naked eye or by using a suitable magnification device to add additional security.

In addition, in the case of a laser, the power of the laser can be controlled in order to create at least some of the spots 10 using different laser powers. Using different laser powers allows the brightness of the spots 10 to be adjusted relative to one another. This difference in spot brightness may also be visible with the naked eye or by using a suitable magnification device to add additional security.

The spots 10 are illustrated in FIG. 3 as being circular dots. However, the spots 10 can have any shape including, but not limited to, lines, which results in formation of the security feature.

In the example illustrated in FIG. 3, the security feature 12 is shown as being formed from text, including the numerals "1982", the letters "DO" and text characters "<<<". The size of the text generally decreases from a first or left end to a second or right end, with the numerals having a height that is greater than the letters. The security feature 12 initially extends upwardly, and then curves downwardly at an angle to the second end.

Figure 4A:
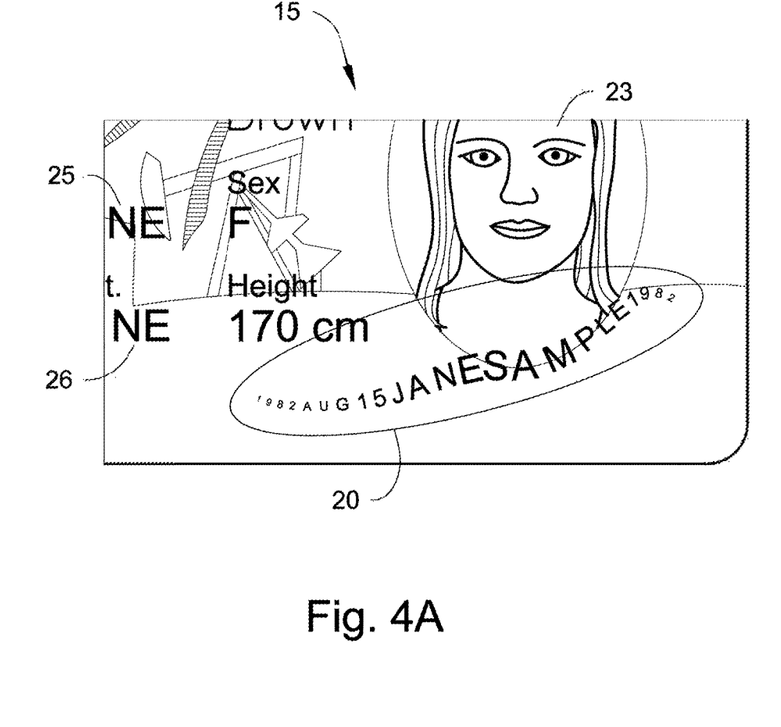
FIGS. 4A, 4B, and 4C illustrate different examples of warped security features that can be formed.

However, many other warped or curved security features are possible, too numerous to mention each one specifically. FIG. 4A illustrates a portion of an identification document 15 in the form of a plastic card or a page of a passport with an example of a warped security feature 20 (the security feature 20 may also be described as being wave-shaped) that is formed by alphanumeric characters, where the size of the characters tapers downwardly in size generally from the middle toward the first and the second end, and the security feature 20 follows a somewhat generally sinusoidal pattern. FIG. 4A also illustrates the identification document as including various personal data of the intended holder of the substrate, such as a photograph or image 23 of the intended holder, the person's name 25 (only a portion of the name 25 is visible), address 26 (only a portion of the address 26 is visible) and other personal data.

Figure 4B:
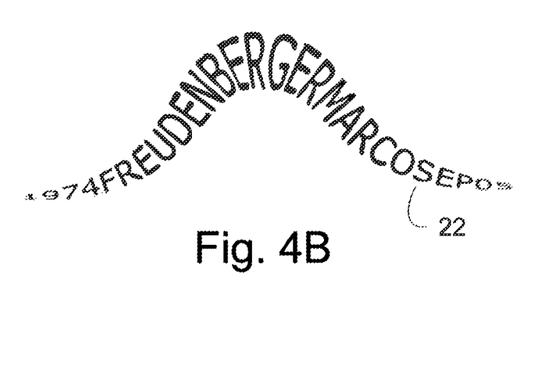
Figure 4C:
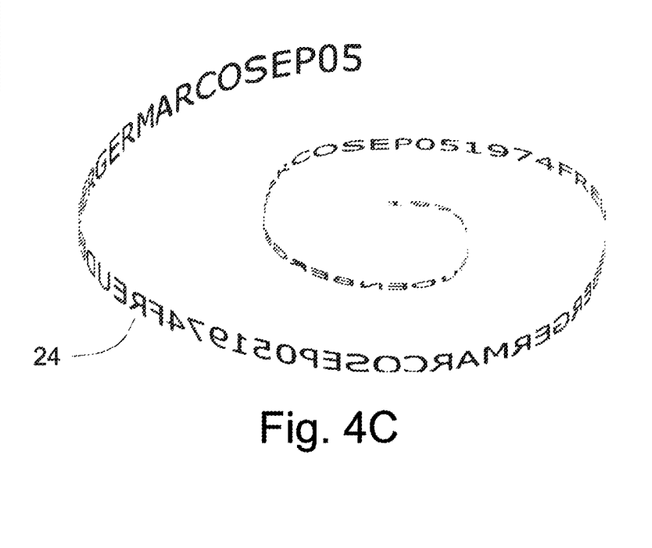

FIG. 4B illustrates an example of a warped security feature 22 (the security feature 22 may also be described as being wave-shaped) that is formed by alphanumeric characters where the size of the characters tapers downwardly in size generally from them middle toward the first and the second end, and the security feature 22 includes an upward, generally bell-shaped curve. FIG. 4C illustrates an example of a warped security feature 24 that is formed by alphanumeric characters arranged into a spiral configuration, with the size of the characters being reduced toward the center of the spiral.

Similar shapes or effects as those shown in FIGS. 3 and 4A-C could be used on images such as photographs of the intended document holders, corporate logos, and other images. Alternatively, text and/or images can be warped into generally circular, ball-like figures.

Figure 5:
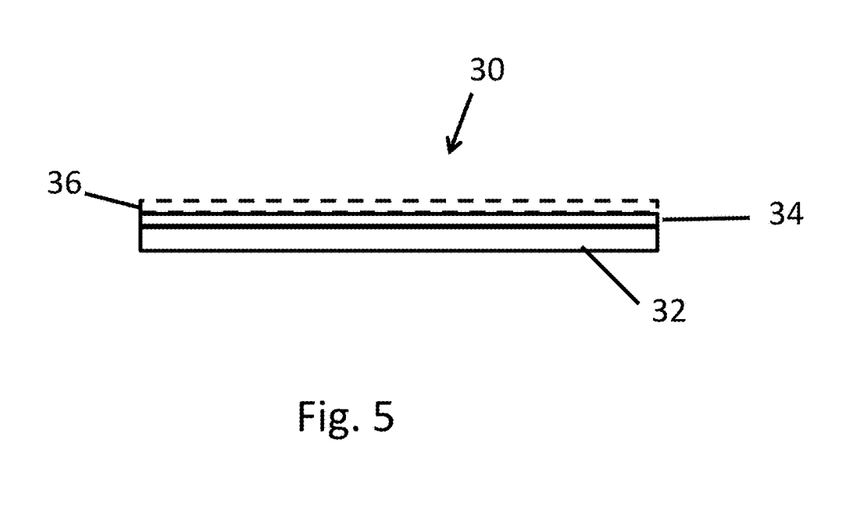
FIG. 5 is a cross-sectional view of an example construction of a plastic card on which the warped security feature can be formed.

With reference to FIG. 5, an example construction of a card 30 is illustrated on which the security feature described herein can be formed. The card 30 can be constructed of a card core or substrate 32 formed of any suitable material including, but not limited to, polycarbonate (PC), polyvinyl chloride (PVC), acrylonitrile butadiene styrene (ABS), polyester, polypropylene, other suitable thermoplastic materials, or combinations thereof. Conventional printing such as printed graphics and personalization data such as name, address, a photograph, and the like, can be located on the surface of the substrate 32. Although FIG. 5 implies that the core 32 is formed of a single material, the substrate 32 can be formed from multiple layers.

Optionally, one or more laser receptive layers 34 can be disposed over the substrate 32. The laser receptive layer(s) 34 is formed of a material that reacts/changes when exposed to radiation from a laser beam, often turning a dark color to create a mark in or on the layer 34. Commercially available laser reactive materials can be used for the layer 34 including, but not limited to, material sold under the trade name MAKROFOL® by Bayer Material Science LLC. The security features described herein can be formed in the laser receptive layer(s) and/or in another part(s) of the substrate. For example, a portion of the security feature can be formed in the laser receptive layer while a remaining portion or portions of the security feature can be formed in another part or parts of the substrate.

Although FIG. 5 shows the layer 34 as covering the entire surface of the substrate 32, the layer 34 need not cover the entire surface. Instead, the layer 34 can cover only a portion of the substrate 32, for example in the form of a patch. In one embodiment, the security feature 12 is formed in the laser receptive layer 34 near the surface of the substrate 32.

An optional topcoat layer 36 can be applied over the layer(s) 34 and the substrate 32. Examples of suitable topcoats include, but are not limited to, any of the overlays sold by Entrust Datacard Corporation of Shakopee, Minn. under the names Topcoat, DuraShield™, CardGard™, and DuraGard™.

One or more additional layers can be located between the substrate 32 and the layer(s) 34, between the layer(s) 34 and the topcoat 36 if used, as well as between laser receptive layers 34 if multiple layers 34 are used.

The security feature described herein can also be formed in a passport, for example on a passport page such as a polycarbonate page sewn into the passport booklet. In the case of a passport page, the page can include a core or substrate, with one or more protective layers disposed over the substrate.

It is also possible to form the security feature from a combination of laser marking and printing.

Additional aspects of the invention can include the following:

Aspect 1. A warped security feature on a substrate, comprising:
  a plurality of spaced spots created on the substrate by a print mechanism to form the warped security feature, wherein the spacing between at least some of the spots is irregular; and wherein
  the spots are arranged into a pattern that follows a curved path.

Aspect 2. The warped security feature of aspect 1, wherein the substrate is a plastic card or a passport page and includes personal data of an intended holder of the substrate.

Aspect 3. The warped security feature of any one of aspect 1 or aspect 2, wherein the print mechanism is a laser of a laser processing mechanism.

Aspect 4. The warped security feature of aspect 3, wherein at least some of the spots are produced using different laser power and have different intensities.

Aspect 5. The warped security feature of any one of aspect 1 to aspect 4, wherein the spots create alphanumeric characters or an image.

Aspect 6. An identification document, comprising:
  a substrate;
  an image of the intended holder of the identification document on the substrate; and
  a security feature on the substrate, the security feature including a plurality of spaced spots that are arranged to form a visually discernible pattern, wherein the spacing between at least some of the spots is irregular and wherein the spots are arranged to follow a curved path.

Aspect 7. The identification document of aspect 6, further comprising a laser receptive layer disposed on the substrate, and the spots are formed in the laser receptive layer.

Aspect 8. The identification document of any one of aspect 6 or aspect 7, wherein the identification document is a plastic card or a passport page and further including the name of the intended holder of the identification document.

Aspect 9. The identification document of any one of aspects 6 to 8, wherein at least a portion of the security feature is tactile.

Aspects 1 to 9 can be used individually or in any combination, and any of aspects 1 to 9 can be used, individually or in any combination thereof, with any of the features recited in the claims.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of producing a warped security feature on a plastic card or a passport page, comprising:
   creating a hybrid vector/bitmap data stream that is used to form the warped security feature, the hybrid vector/bitmap data stream includes vector position information and intensity value information;
   using the hybrid vector/bitmap data stream to control a print mechanism to create spaced spots on the plastic card or a passport page to form the warped security feature, the print mechanism following curved vector lines dictated by the vector position information and the intensity value information is used to create the spots that form the warped security feature.

2. The method of claim 1, wherein the spots are dots or lines.

3. The method of claim 1, wherein the print mechanism comprises a laser of a laser processing mechanism.

4. The method of claim 3, comprising adjusting the power of the laser based on the intensity value information to create at least some of the spots using different laser powers.

5. The method of claim 3, comprising controlling the laser to create at least some of the spots with irregular spacing between the spots.

6. The method of claim 1, wherein the warped security feature comprises alphanumeric characters or an image.

7. The method of claim 1, wherein the hybrid vector/bitmap data stream is generated by performing a rendering process on data that represents the warped security feature by taking a vectorial description of the data and warping the vectorial description to a target, and rendering the warped vectorial description into the vector position information of the hybrid vector/bitmap data stream.

8. The method of claim 1, wherein the plastic card or passport page includes personal data of an intended holder of the plastic card or passport page.

9. A plastic card or a passport that includes the passport page containing the warped security feature produced by the method of claim 1.

10. A warped security feature on a plastic card or on a passport page that is produced by the method of claim 1.

* * * * *